US011516199B2

(12) United States Patent
Barton et al.

(10) Patent No.: US 11,516,199 B2
(45) Date of Patent: Nov. 29, 2022

(54) ZERO TRUST FOR EDGE DEVICES

(71) Applicant: Cisco Technology, Inc., San Jose, CA (US)

(72) Inventors: Robert E. Barton, Richmond (CA); Stephan Edward Friedl, Frederick, CO (US); Anoop Mohan, San Ramon, CA (US); Norbert Heusser, Bornheim (DE); Yogesh Kumar Soni, Fremont, CA (US); Daniel Eckstein, Bonn (DE)

(73) Assignee: Cisco Technology, Inc., San Jose, CA (US)

( * ) Notice: Subject to any disclaimer, the term of this patent is extended or adjusted under 35 U.S.C. 154(b) by 315 days.

(21) Appl. No.: 16/931,902

(22) Filed: Jul. 17, 2020

(65) Prior Publication Data
US 2022/0021665 A1 Jan. 20, 2022

(51) Int. Cl.
*H04L 9/40* (2022.01)
*H04W 12/08* (2021.01)
*H04W 12/06* (2021.01)

(52) U.S. Cl.
CPC .............. *H04L 63/08* (2013.01); *H04L 63/10* (2013.01); *H04W 12/06* (2013.01); *H04W 12/08* (2013.01)

(58) Field of Classification Search
CPC ........ H04L 63/10; H04L 63/08; H04W 12/06; H04W 12/08
See application file for complete search history.

(56) References Cited

U.S. PATENT DOCUMENTS 9,438,596 B2 * 9/2016 Zou .................... H04L 63/0876
9,811,387 B2 11/2017 Baughman et al.
(Continued)

FOREIGN PATENT DOCUMENTS

CN   109862087 A   6/2019

OTHER PUBLICATIONS

X. Zhang, B. Zheng and L. Pan, "Using Virtual Reality Technology to Visualize Management of College Assets in the Internet of Things Environment," in IEEE Access, vol. 8, pp. 157089-157102, 2020. (Year: 2020).*

(Continued)

*Primary Examiner* — Kari L Schmidt
(74) *Attorney, Agent, or Firm* — Behmke Innovation Group LLC; Kenneth J. Heywood; Jonathon P. Western

(57) ABSTRACT

In one embodiment, a networking device at an edge of a network enrolls with a controller that supervises operation of the networking device. The networking device sends a publication request to a cloud-based messaging service. The networking device provides, to the cloud-based messaging service, identification information that indicates the controller that supervises operation of the networking device. The networking device receives, from the cloud-based messaging service, authorization to publish messages to the cloud-based messaging service. The cloud-based messaging service uses the identification information to confirm an identity of the networking device with the controller that supervises operation of the networking device. The networking device sends, after receiving authorization to publish messages to the cloud-based messaging service, a message for publication to the cloud-based messaging service. The message comprises data sourced from an endpoint in the network.

20 Claims, 13 Drawing Sheets

(56) References Cited

U.S. PATENT DOCUMENTS

| | | | |
|---|---|---|---|
| 9,813,418 B1 | 11/2017 | Banerjee | |
| 10,007,513 B2 | 6/2018 | Malladi et al. | |
| 10,154,019 B2 | 12/2018 | McRoberts et al. | |
| 10,230,798 B2 | 3/2019 | Doraiswamy et al. | |
| 10,333,849 B2 | 6/2019 | Masurekar et al. | |
| 10,341,868 B2 | 7/2019 | Ross et al. | |
| 10,440,096 B2 | 10/2019 | Sabella et al. | |
| 10,637,783 B2 | 4/2020 | Krishna Singuru | |
| 10,693,878 B2 | 6/2020 | Frahim et al. | |
| 10,925,118 B1* | 2/2021 | Lin | G06N 3/02 |
| 2002/0083178 A1* | 6/2002 | Brothers | H04L 63/10 |
| | | | 709/218 |
| 2015/0007272 A1* | 1/2015 | Zou | H04L 63/08 |
| | | | 726/4 |
| 2016/0087881 A1* | 3/2016 | Ge | H04L 67/63 |
| | | | 709/244 |
| 2016/0182639 A1 | 6/2016 | Hong et al. | |
| 2017/0126603 A1* | 5/2017 | Chen | H04L 51/214 |
| 2018/0034913 A1* | 2/2018 | Matthieu | H04L 67/52 |
| 2018/0054490 A1 | 2/2018 | Wadhwa et al. | |
| 2018/0183896 A1* | 6/2018 | Cannon | H04L 67/52 |
| 2018/0295016 A1* | 10/2018 | Frahim | H04L 41/082 |
| 2018/0316555 A1 | 11/2018 | Salgueiro et al. | |
| 2018/0316681 A1 | 11/2018 | Frahim et al. | |
| 2019/0007794 A1* | 1/2019 | Thakur | H04W 4/023 |
| 2019/0044703 A1 | 2/2019 | Smith | |
| 2019/0068400 A1* | 2/2019 | Krikorian | H04L 67/125 |
| 2019/0158606 A1 | 5/2019 | Guim Bernat et al. | |
| 2019/0230063 A1* | 7/2019 | McCready | H04W 12/08 |
| 2019/0253458 A1* | 8/2019 | Gnessin | H04L 63/08 |
| 2020/0012517 A1* | 1/2020 | Bruderek | G06F 9/45558 |
| 2020/0021586 A1* | 1/2020 | Schmidt | H04W 12/069 |
| 2020/0021669 A1* | 1/2020 | Bikumala | H04L 67/55 |
| 2020/0059881 A1* | 2/2020 | Gupta | H04L 63/0807 |
| 2020/0287974 A1* | 9/2020 | Gnessin | H04L 43/0888 |
| 2020/0389528 A1* | 12/2020 | Ha | H04L 67/51 |
| 2021/0021688 A1* | 1/2021 | Du | H04L 49/3009 |
| 2021/0044972 A1* | 2/2021 | Murray | G06F 21/602 |
| 2021/0109735 A1* | 4/2021 | Ali | H04L 41/0886 |
| 2021/0192183 A1* | 6/2021 | Hasegawa | H04L 63/08 |
| 2021/0211515 A1* | 7/2021 | Rozo | H04L 63/0861 |
| 2021/0258260 A1* | 8/2021 | Nakahara | H04L 45/70 |
| 2021/0314407 A1* | 10/2021 | Ng | G06N 5/04 |
| 2021/0336959 A1* | 10/2021 | Shah | H04L 67/563 |
| 2021/0377223 A1* | 12/2021 | Chanak | H04L 67/01 |

OTHER PUBLICATIONS

Ferretti, Luca, Mirco Marchetti, and Michele Colajanni. "Fog-based secure communications for low-power IoT devices." ACM Transactions on Internet Technology (TOIT) 19.2 (2019): 1-21. (Year: 2019).*

Chaudhry, Shehzad Ashraf, et al. "Rotating behind privacy: an improved lightweight authentication scheme for cloud-based IoT environment." ACM Transactions on Internet Technology (TOIT) 21.3 (2021): 1-19. (Year: 2021).*

J. Hwang, L. Nkenyereye, N. Sung, J. Kim and J. Song, "IoT Service Slicing and Task Offloading for Edge Computing," in IEEE Internet of Things Journal, vol. 8, No. 14, pp. 11526-11547, 15 Jul. 15, 2021. (Year: 2021).*

"Authenticating & Authorizing Devices using MQTT with Auth0", online: https://auth0.com/docs/integrations/authenticating-devices-using-mqtt, printed Jul. 2020, 12 pages.

Bhardwaj, Mohit, "How IoT Gateway Clustering Ensures Reliability & High Availability", online: https://www.einfochips.com/blog/iot-gateway-architecture-clustering-ensures-reliability/, Aug. 2017 (printed Jun. 2020), 5 pages, eInfoChips.

Calabretta, et al., "MQTT-Auth: a Token-Based Solution to Endow MQTT with Authentication and Authorization Capabilities", Journal of Communications Software and Systems, vol. 14, No. 4, Dec. 2018, pp. 320-331.

Liu, et al., "Software-Defined Edge Cloud Framework for Resilient Multitenant Applications", Wireless Communications and Mobile Computing, vol. 2019, Article ID 3947286, Jan. 2019, 17 pages, Hindawi.

Pan, et al., "EdgeChain: An Edge-IoT Framework and Prototype Based on Blockchain and Smart Contracts", arXiv:1806.06185v1, Jun. 2018, 14 pages.

Samaniego, et al., "Zero-Trust Hierarchical Management in IoT", 2018 IEEE International Congress on Internet of Things, Jul. 2018, pp. 88-95, IEEE.

Sengul, et al. "MQTT-TLS Profile of ACE", draft-ietf-ace-mqtt-tls-profile-05, ACE Working Group Internet Draft, May 2020, 29 pages, IETF Trust.

Weber, Yannick, "Implementing MQTT Challenge-Response Authentication", online: https://www.hivemq.com/blog/implementing-challenge-response-auth/, Mar. 2020, 12 pages.

* cited by examiner

ZERO TRUST FOR EDGE DEVICES

TECHNICAL FIELD

The present disclosure relates generally to computer networks, and, more particularly, to zero trust for edge devices.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

As the IoT evolves, the variety of IoT devices will continue to grow, as well as the number of applications associated with the IoT devices. For instance, multiple cloud-based, business intelligence (BI) applications may take as input measurements captured by a particular IoT sensor. To this end, data pipelines arm often constructed from the edge device(s) of the IoT network to the destination cloud provider.

The reliance on edge device(s) to convey data from IoT devices to the cloud presents the potential for malicious actors to spoof the identity of a legitimate edge device. For instance, the malicious actor may report false values to the cloud, triggering false alerts, potentially disrupting the operation of the IoT network, or causing other undesired effects.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
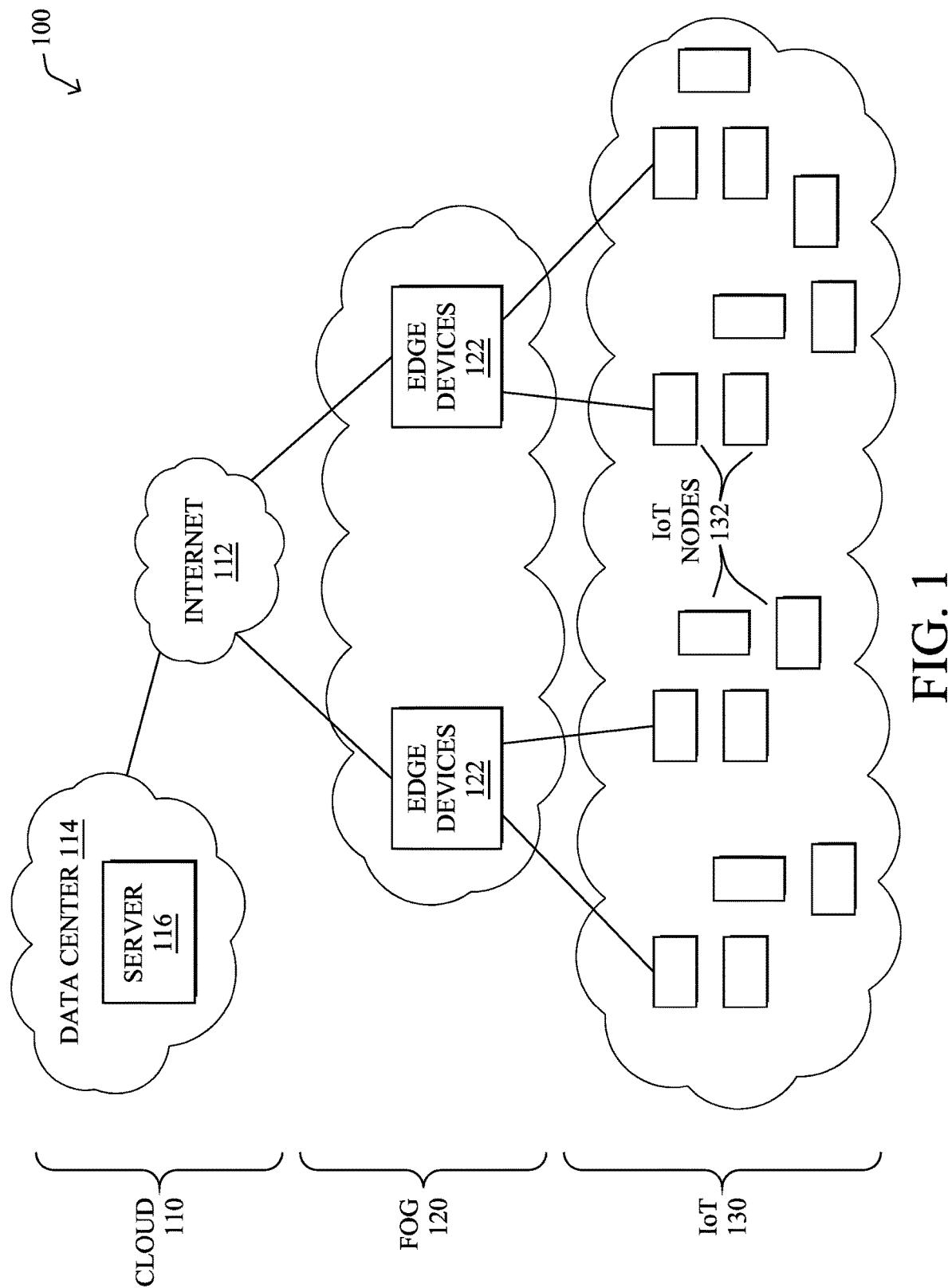
FIG. 1 illustrate an example network.

According to one or more embodiments of the disclosure, a networking device at an edge of a network enrolls with a controller that supervises operation of the networking device. The networking device sends a publication request to a cloud-based messaging service. The networking device provides, to the cloud-based messaging service, identification information that indicates the controller that supervises operation of the networking device. The networking device receives, from the cloud-based messaging service, authorization to publish messages to the cloud-based messaging service. The cloud-based messaging service uses the identification information to confirm an identity of the networking device with the controller that supervises operation of the networking device. The networking device sends, after receiving authorization to publish messages to the cloud-based messaging service, a message for publication to the cloud-based messaging service. The message comprises data sourced from an endpoint in the network.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art. That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
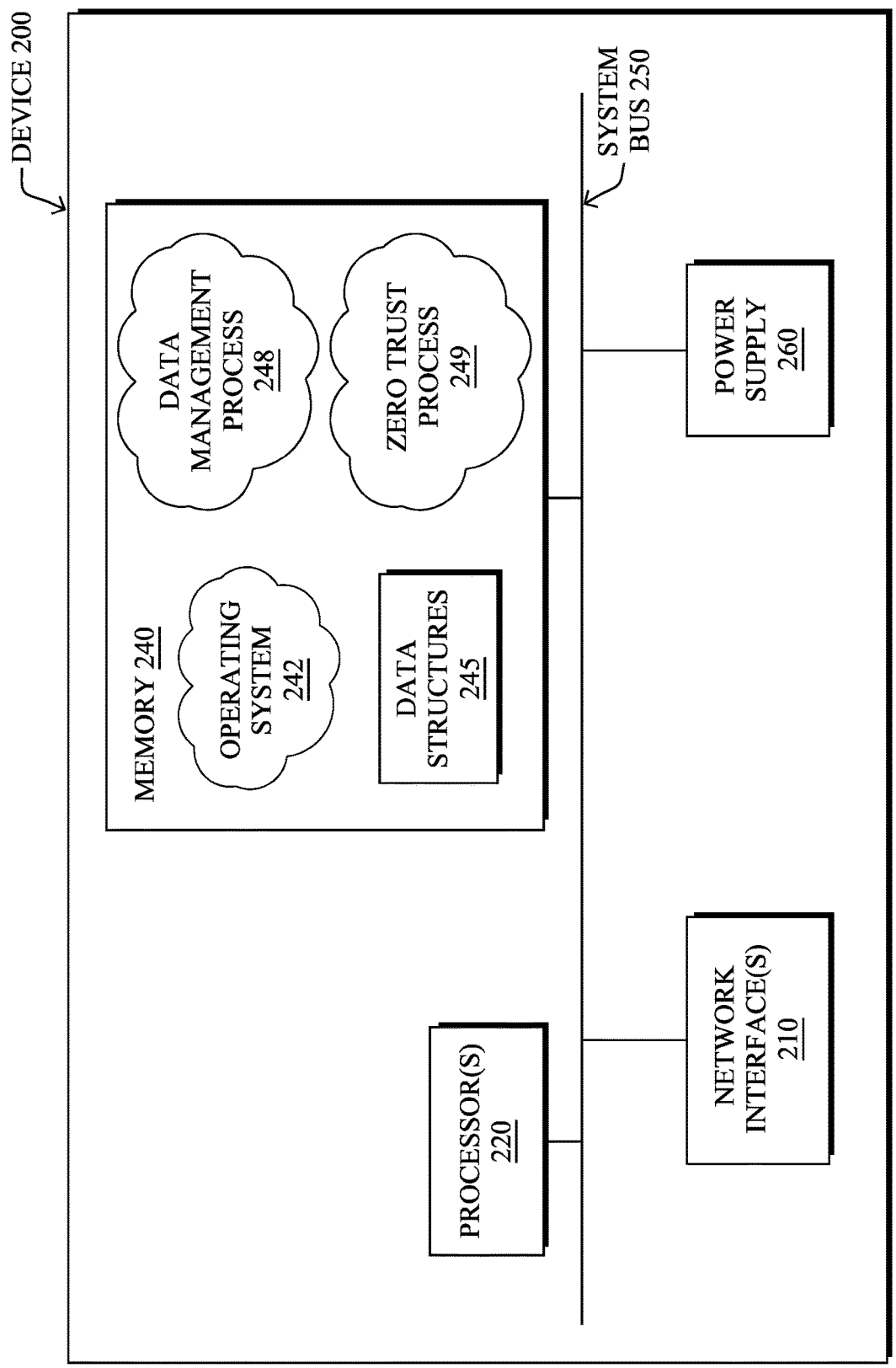
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below.

The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative data management process 248 and/or a zero trust process 249, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
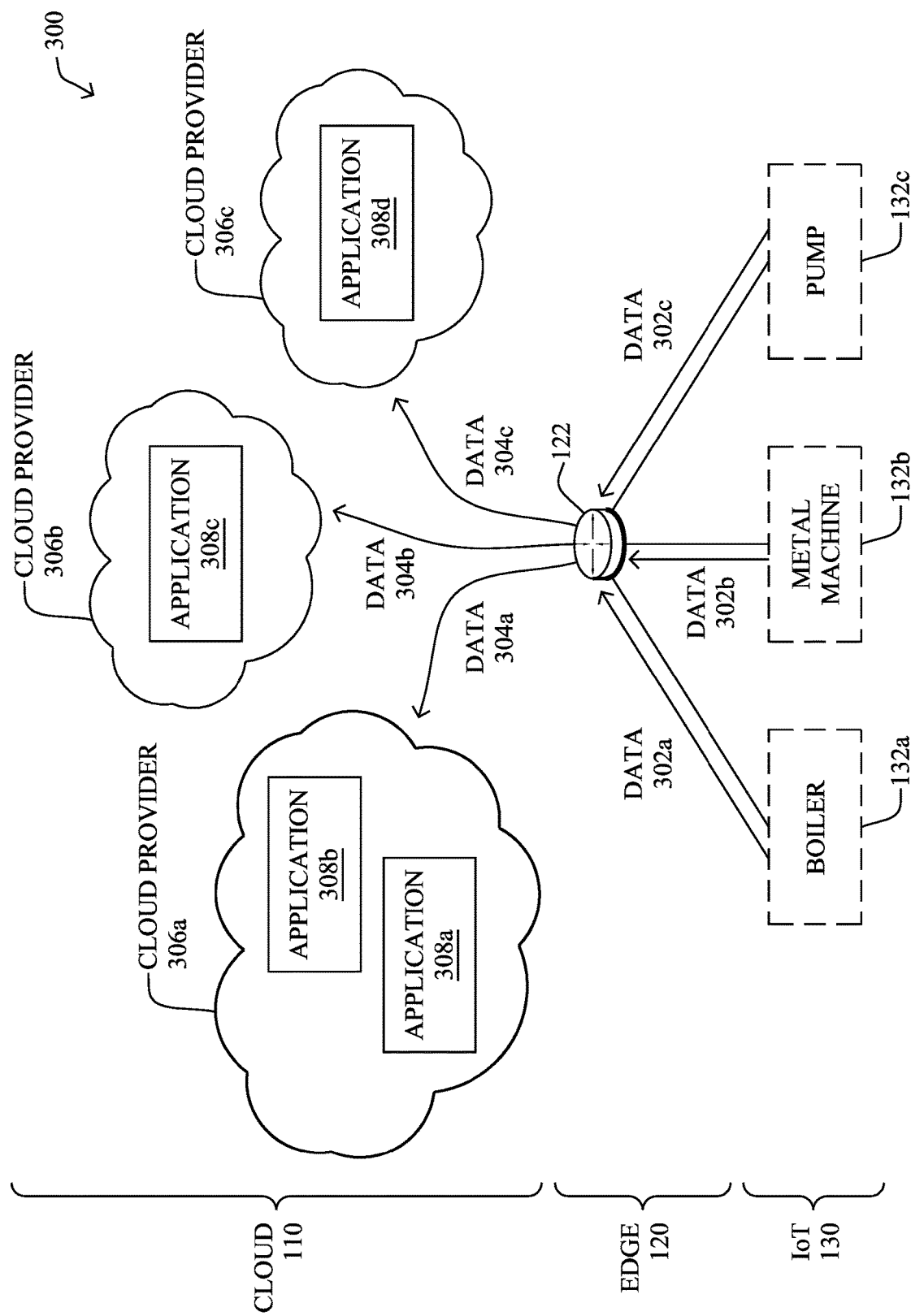
FIG. 3 illustrates an example network architecture for edge to multi-cloud processing and governance.

FIG. 3 illustrates an example network architecture 300 for edge to multi-cloud processing and governance, according to various embodiments. As shown, consider the case of an IoT network at IoT layer 130 that comprises a plurality of nodes 132, such as node 132a (e.g., a boiler), node 132b (e.g., a metal machine), and node 132c (e.g., a pump). Notably, the IoT network at IoT layer 130 may comprise any numbers of sensors and/or actuators. For instance, the network may be located in an industrial setting, such as a factory, port, substation, or the like, a smart city, a stadium, a conference or office building, or any other location in which IoT devices may be deployed.

As noted above, as the IoT evolves, the variety of IoT devices will continue to grow, as well as the number of applications associated with the IoT devices. As a result, multiple cloud-based applications may take as input measurements or other data generated by a particular IoT device/node. For instance, as shown, assume that IoT nodes 132a-132c generate data 302a-302c, respectively, for consumption by any number of applications 308 hosted by different cloud providers 306, such as Microsoft Azure, Software AG, Quantela, MQTT/DC, or the like.

To complicate the collection and distribution of data 302a-302c, the different applications 308 may also require different sets of data 304a-304c from data 302a-302c. For instance, assume that cloud provider 306a hosts application 308a, which is a monitoring application used by the operator of the IoT network. In addition, cloud provider 306a may also host application 308b, which is a developer application that allows the operator of the IoT network to develop and deploy utilities and configurations for the IoT network. Another application, application 308c, may be hosted by an entirely different cloud provider 306b and be used by the vendor or manufacturer of a particular IoT node 132 for purposes. Finally, a further application, application 308d, may be hosted by a third cloud provider 306c, which is used by technicians for purposes of diagnostics and the like.

Figure 4A:
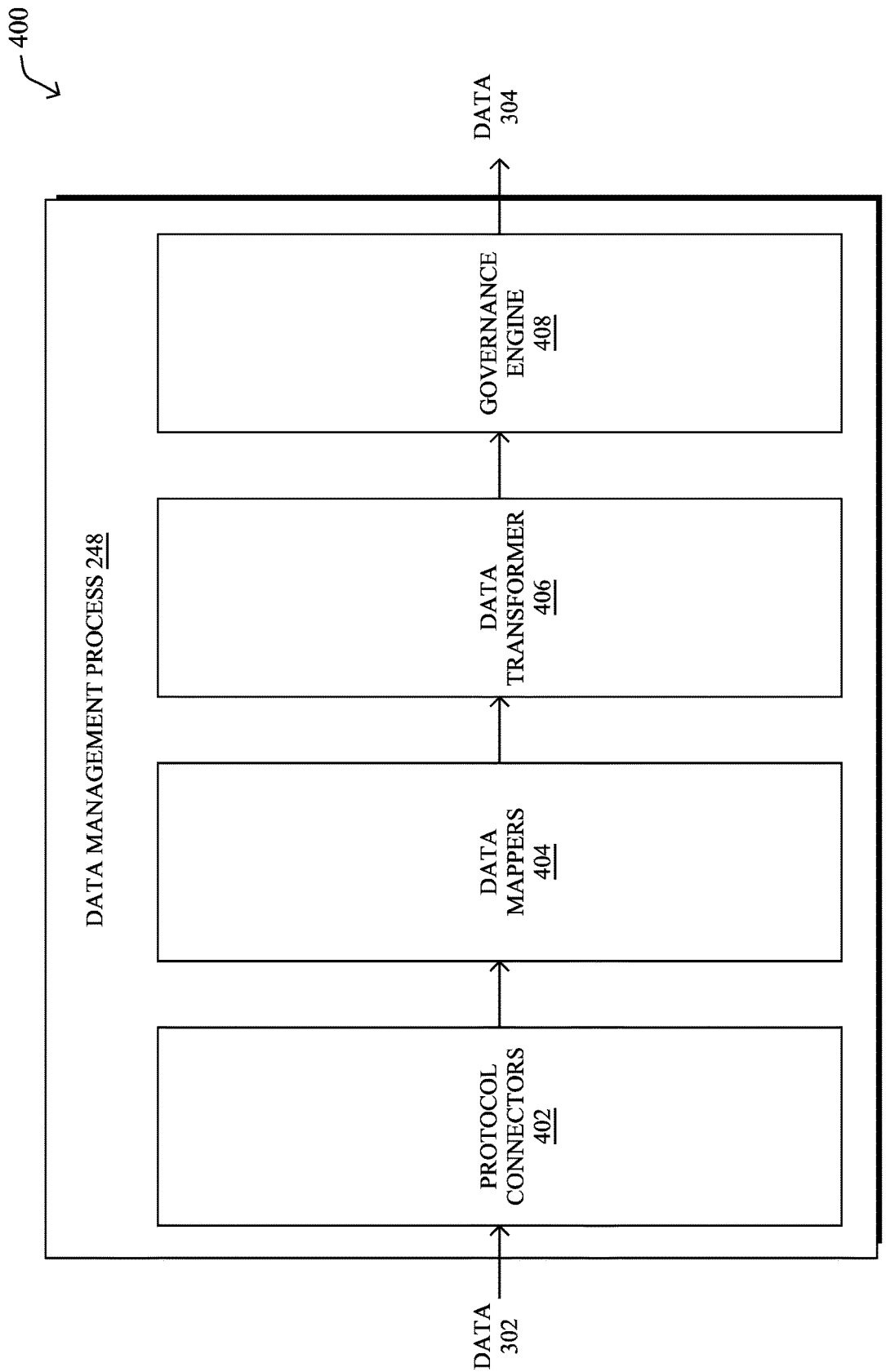
FIGS. 4A-4B illustrate examples of data processing by an edge device in a network.

From the standpoint of the edge device 122, such as a router or gateway at the edge of the IoT network, the lack of harmonization between data consumers can lead to overly complicated data access policies, virtual models of IoT nodes 132 (e.g., 'device twins' or 'device shadows') that are often not portable across cloud providers 306, and increased resource consumption. In addition, different IoT nodes may communicate using different protocols within the IoT network. For instance, IoT nodes 132a-132c may communicate using MQTT, Modbus, OPC Unified Architecture (OPC UA), combinations thereof, or other existing communication protocols that are typically used in IoT networks. As a result, the various data pipelines must be configured on an individual basis at device 122 and for each of the different combinations of protocols and destination cloud providers 306. FIG. 4A illustrates an example architecture 400 for data management process 248, according to various embodiments. As shown, data management process 248 may comprise any or all of the following components: a plurality of protocol connectors 402, data mappers 404, a data transformer 406, and/or a governance engine 408. Typically, these components are executed on a single device located at the edge of the IoT network. However, further embodiments provide for these components to be executed in a distributed manner across multiple devices, in which case the combination of devices can be viewed as a singular device for purposes of the teachings herein. Further, functionalities of the components of architecture 400 may also be combined, omitted, or implemented as part of other processes, as desired.

During execution, protocol connectors 402 may comprise a plurality of southbound connectors that are able to extract data 302 from traffic in the IoT network sent via any number of different protocols. For instance, protocol connectors 402 may include connectors for OPC UA, Modbus, Ethernet/IP, MQTT, and the like. Accordingly, when the device executing data management process 248 (e.g., device 200) receives a message from the IoT network, such as a packet, frame, collection thereof, or the like, protocol connectors 402 may process the message using its corresponding connector to extract the corresponding data 302 from the message.

Once data management process 248 has extracted data 302 from a given message using the appropriate connector in protocol connectors 402, data mappers 404 may process the extracted data 302. More specifically, in various embodiments, data mappers 404 may normalize the extracted data 302. Typically, this may entail identifying the data extracted from the traffic in the network as being of a particular data type and grouping the data extracted from the traffic in the network with other data of the particular data type. In some instances, this may also entail associating a unit of measure with the extracted data 302 and/or converting a data value in one unit of measure to that of another.

In various embodiments, once data 302 has been extracted and normalized, data transformer 406 may apply any number of data transformation to the data. In some embodiments, data transformer 406 may transform data 302 by applying any number of mathematical and/or symbolic operations to it. For instance, data transformer 406 may apply a data compression or data reduction to the extracted and normalized data 302, so as to summarize or reduce the volume of data transmitted to the cloud. To do so, data transformer 406 may sample data 302 over time, compute statistics regarding data 302 (e.g., its mean, median, moving average, etc.), apply a compression algorithm to data 302, combinations thereof, or the like.

In further embodiments, data transformer 406 may apply analytics to the extracted and normalized data 302, so as to transform the data into a different representation, such as an alert or other indication. For instance, data transformer 406 may apply simple heuristics and/or thresholds to data 302, to transform data 302 into an alert. In another embodiment, data transformer 406 may apply machine learning to data 302, to transform the data.

In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Data transformer 406 may employ one or more supervised, unsupervised, or semi-supervised machine learning models. Generally, supervised learning entails the use of a training set of data that is used to train the model to apply labels to the input data. For example, the training data may include samples of 'good' readings or operations and 'bad' readings or operations that are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. For instance, an unsupervised model may Semi-supervised learning models take a middle ground approach that uses a greatly reduced set of labeled training data.

Example machine learning techniques that data transformer 406 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, deep learning models, or the like.

In further embodiments, data transformer 406 may comprise a scripting engine that allows developers to deploy any number of scripts to be applied to data 302 for purposes of the functionalities described above. For instance, an application developer may interface with application 308b shown previously in FIG. 3, to develop and push various scripts for execution by data transformer 406, if allowed to do so by policy. In other cases, previously developed scripts may also be pre-loaded into data transformer 406 and/or made available by the vendor or manufacturer of the device executing data management process 248 for deployment to data transformer 406.

According to various embodiments, another potential component of data management process 248 is governance engine 408 that is responsible for sending the data 302 transformed by data transformer 406 to any number of cloud providers as data 304. In general, governance engine 408 may control the sending of data 304 according to a policy. For instance, governance engine 408 may apply a policy that specifies that data 304 may be sent to a particular cloud provider and/or cloud-based application, but should not be sent to others. In some embodiments, the policy enforced by governance engine 408 may control the sending of data 304 on a per-value or per-data type basis. For instance, consider the case of an IoT node reporting a temperature reading and pressure reading. In such a case, governance engine 408 may send the temperature reading to a particular cloud provider as data 304 while restricting the sending of the pressure reading, according to policy.

As would be appreciated, by unifying the policy enforcement via governance engine 408, the various stakeholders in the data pipelines are able to participate in the creation and maintenance of the enforced policies. Today, the various data pipelines built to support the different network protocols and cloud vendors results in a disparate patchwork of policies that require a level of expertise that not every participant may possess. In contrast, by unifying the policy enforcement via governance engine 408, personnel such as security experts, data compliance representatives, technicians, developers, and the like can participate in the administration of the policies enforced by governance engine 408.

Figure 4B:
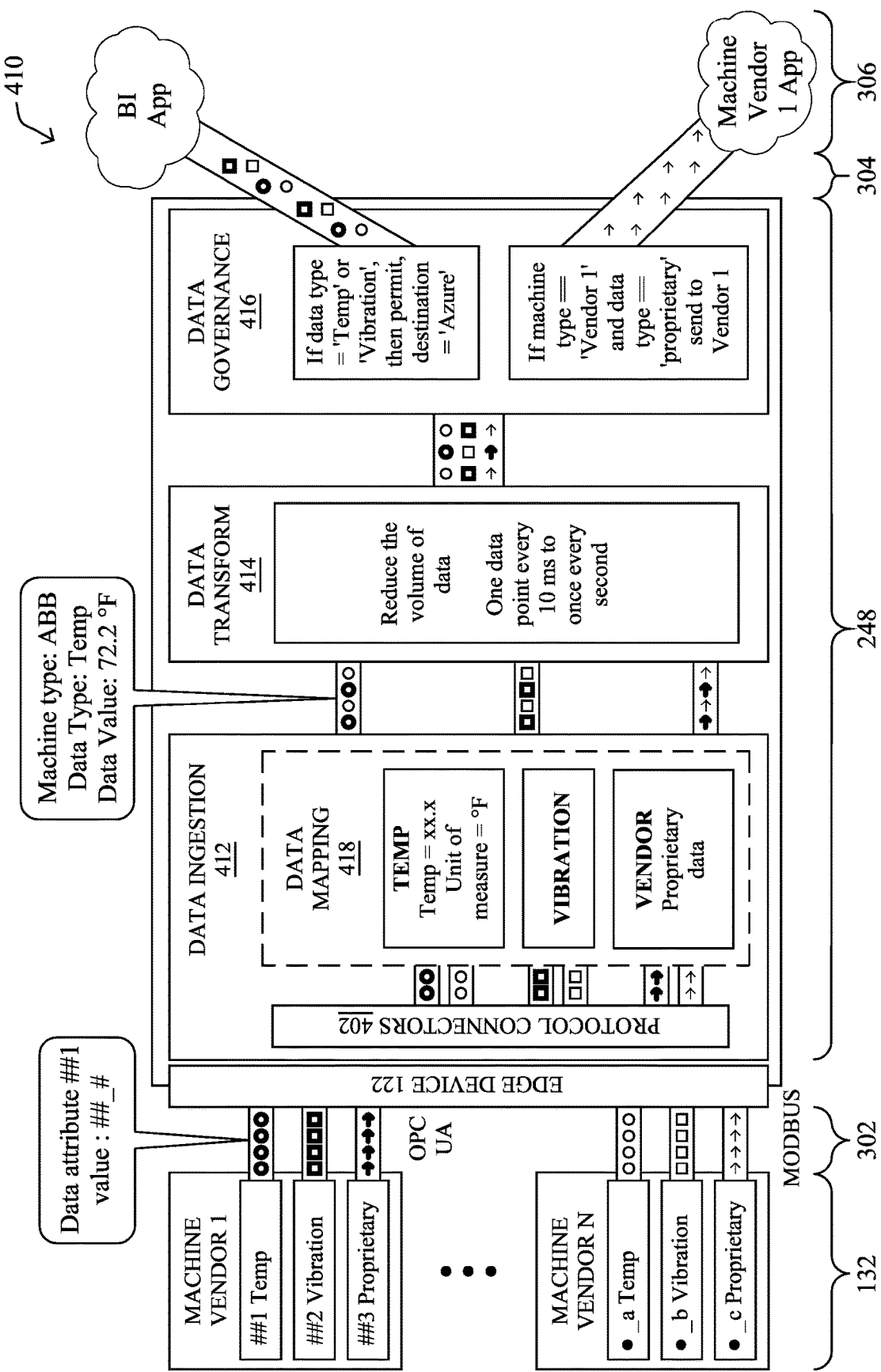

FIG. 4B illustrates an example 410 of the operation of data management process 248 during execution, according to various embodiments. As shown, assume that edge device 122 described previously (e.g., a device 200) executes data management process 248 at the edge of an IoT network that comprises IoT nodes 132. During operation, edge device 122 may communicate with IoT nodes 132 in the network that comprise devices from n-number of different vendors.

Each set of vendor devices in IoT nodes 132 may generate different sets of data, such as sensor readings, computations, or the like. For instance, the devices from a first machine vendor may generate data such as a proprietary data value, a temperature reading, and a vibration reading. Similarly, the devices from another machine vendor may generate data such as a temperature reading, a vibration reading, and another data value that is proprietary to that vendor.

As would be appreciated, the data 302 generated from each group of IoT nodes 132 may use different formats that are set by the device vendors or manufacturers. For instance, two machines from different vendors may both report temperature readings, but using different data attribute labels (e.g., "temp=," "temperature=," "##1," "*_a," etc.). In addition, the actual data values may differ by vendor, as well. For instance, the different temperature readings may report different levels of precision/number of decimals, use different units of measure (e.g., Celsius, Fahrenheit, Kelvin, etc.), etc.

Another way in which data 302 generated by IoT nodes 132 may differ is the network protocol used to convey data 302 in the network. For instance, the devices from one machine vendor may communicate using the OPC UA protocol, while the devices from another machine vendor may communicate using the Modbus protocol.

In response to receiving data 302 from IoT nodes 132, data management process 248 of edge device 122 may process data 302 in three stages: a data ingestion phase 412, a data transformation phase 414, and a data governance phase 416. These three processing phases operate in conjunction with one another to allow edge device 122 to provide data 304 to the various cloud providers 306 for consumption by their respective cloud-hosted applications.

During the data ingestion phase 412, protocol connectors 402 may receive messages sent by IoT nodes 132 in their respective protocols, parse the messages, and extract the relevant data 302 from the messages. For instance, one protocol connector may process OPC UA messages sent by one set of IoT nodes 132, while another protocol connector may process Modbus messages sent by another set of IoT nodes 132. Once protocol connectors 402 have extracted the relevant data 302 from the messages, data management process 248 may apply a data mapping 418 to the extracted data, to normalize the data 302. For instance, data management process 248 may identify the various types of reported data 302 and group them by type, such as temperature measurements, vibration measurements, and vendor proprietary data. In addition, the data mapping 418 may also entail standardizing the data on a particular format (e.g., a particular number of digits, unit of measure, etc.). The data mapping 418 may also entail associating metadata with the extracted data 302, such as the source device type, its vendor, etc.

During its data transformation phase 414, data management process 248 may apply various transformations to the results of the data ingestion phase 412. For instance, assume that one IoT node 132 reports its temperature reading every 10 milliseconds (ms). While this may be acceptable in the IoT network, and even required in some cases, reporting the temperature readings at this frequency to the cloud-providers may represent an unnecessary load on the WAN connection between edge device 122 and the cloud provider(s) 306 to which the measurements are to be reported. Indeed, a monitoring application in the cloud may only need the temperature readings at a frequency of once every second, meaning that the traffic overhead to the cloud provider(s) 306 can be reduced by a factor of one hundred by simply reporting the measurements at one second intervals. Accordingly, data transformation phase 414 may reduce the volume of data 304 sent to cloud provider(s) 306 by sending only a sampling of the temperature readings (e.g., every hundred), an average or other statistic(s) of the temperature readings in a given time frame, or the like.

During its data governance phase 416, data management process 248 may apply any number of different policies to the transformed data, to control how the resulting data 304 is sent to cloud provider(s) 306. For instance, one policy enforced during data governance phase 416 may specify that if the data type='Temp' or 'Vibration,' then that data is permitted to be sent to destination='Azure,' for consumption by a BI application hosted by Microsoft Azure. Similarly, another policy may specify that if the machine type='Vendor 1' and the data type='proprietary,' then the corresponding data can be sent to a cloud provider associated with the vendor.

In some embodiments, the policy enforced during data governance phase 416 may further specify how data 304 is sent to cloud providers 306. For instance, the policy may specify that edge device 122 should send data 304 to a particular cloud provider 306 via an encrypted tunnel, using a particular set of one or more protocols (e.g., MQTT), how the connection should be monitored and reported, combinations thereof, and the like.

Figure 5:
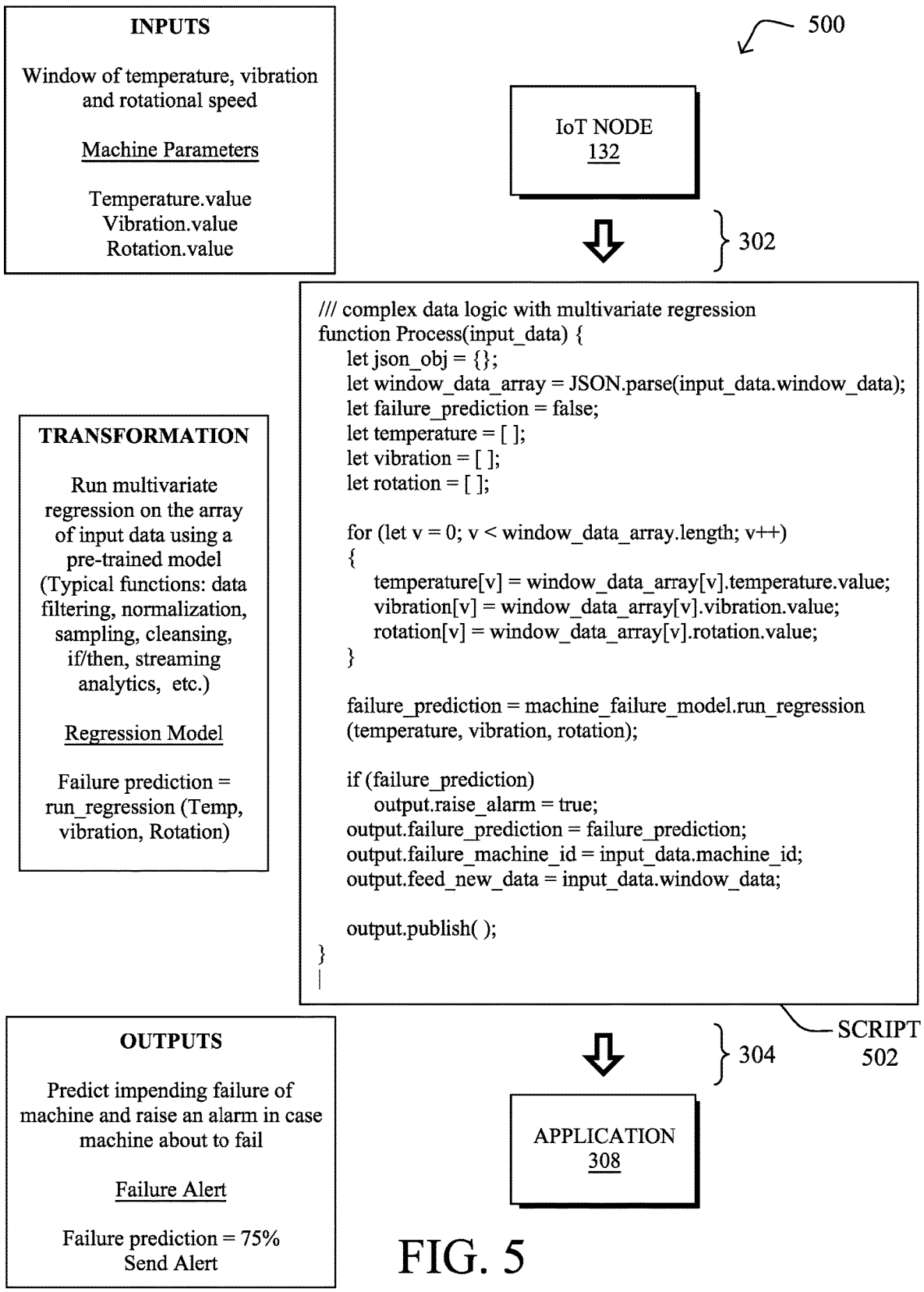
FIG. 5 illustrates an example of the application of a script to data extracted from traffic in a network.

FIG. 5 illustrates an example 500 of the application of a script to data extracted from traffic in a network, according to various embodiments. As noted previously with respect to FIG. 4A, some embodiments of data transformer 406 provide for data transformer 406 to comprise a scripting engine, allowing for customization of the data transformations applied to the data from the IoT nodes 132. For instance, as shown, assume that IoT node 132 generates machine parameters, such as 'temperature.value,' 'vibration.value,' and 'rotation.value,' and sends these parameters to the edge device as data 302.

During its data transformation phase, the edge device may execute a script 502 that takes as input the data 302 provided by IoT node 132, potentially after normalization. In turn, script 502 may perform multivariate regression on the array of input data using a pre-trained machine learning model. Doing so allows script 502 to predict whether IoT node 132 is likely to fail, given its reported temperature, vibration, and rotation measurements. Depending on the results of this prediction, such as when the probability of failure is greater than a defined threshold (e.g., >75%), script 502 may output a failure alert that identifies IoT node 132, the probability of failure, or other information that may be useful to a technician or other user.

In cases in which script 502 generates an alert, the edge device may provide the alert as data 304 to one or more cloud providers for consumption by a cloud-hosted application, such as application 308, in accordance with its data governance policy. Since the input data from IoT node 132 has been extracted to be protocol-independent and normalized, this allows script 502 to predict failures across machines from different vendors. In addition, as the alerting is handled directly on the edge device, this can greatly reduce overhead on its WAN connection, as the edge device may only be required to report alerts under certain circumstances (e.g., when the failure probability is greater than a threshold), rather than reporting the measurements themselves for the analysis to be performed in the cloud.

As noted above, edge devices are increasingly sending data from IoT endpoints to multiple cloud providers for consumption by various applications. In some instances, this may entail the edge device sending the data from the edge to a cloud-based messaging service that acts as a data broker for the data by providing the data to any number of cloud-hosted applications.

From a security perspective, trust between the edge device and the cloud is imperative. Indeed, a malicious actor spoofing the identify of a legitimate edge device can report false data to the cloud. This can lead to alarms being raised for conditions that do not actually exist, security or maintenance actions being taken that are unnecessary (e.g., shutting down a factory machine or system), inaccurate reports being generated, and the like.

Zero Trust for Edge Devices

The techniques herein introduce a zero trust architecture for edge devices that allows cloud-based messaging services to establish trust with an edge device before allowing that device to publish messages to the service. In some aspects, the messaging service may challenge the edge device for identity information. In turn, the messaging service may use the identity information to verify the identity of the edge device with a controller that provides supervisory control over the edge device.

Illustratively, the techniques described herein may be performed by hardware, software, and/or firmware, such as in accordance with the data management process 248 and zero trust process 249, which may include computer executable instructions executed by the processor 220 (or independent processor of interfaces 210) to perform functions relating to the techniques described herein.

Specifically, according to various embodiments, a networking device at an edge of a network enrolls with a controller that supervises operation of the networking device. The networking device sends a publication request to a cloud-based messaging service. The networking device provides, to the cloud-based messaging service, identification information that indicates the controller that supervises operation of the networking device. The networking device receives, from the cloud-based messaging service, authorization to publish messages to the cloud-based messaging service. The cloud-based messaging service uses the identification information to confirm an identity of the networking device with the controller that supervises operation of the networking device. The networking device sends, after receiving authorization to publish messages to the cloud-based messaging service, a message for publication to the cloud-based messaging service. The message comprises data sourced from an endpoint in the network.

Operationally, FIGS. 6A-6F illustrates an example 600 of the zero trust onboarding of an edge device, according to various embodiments. Continuing the previous examples, assume that there is an edge device 122 located at the edge of a network in which IoT nodes 132a-132c are located. As shown, also assume that there is a controller 604 that is part of a configuration and control plane 606 and provides supervisory control over edge device 122, once edge device 122 is enrolled with controller 604. For instance, controller 604 may take the form of Edge Intelligence Control Service by Cisco Systems, Inc., or another device that provides a supervisory service to edge device 122. Note that while controller 604 is typically located external to the network in which IoT nodes 132a-132c are located, further embodiments provide for controller 604 to be located within that network, as well.

For purposes of illustrating the techniques herein, assume that there is a messaging service 602 (e.g., an application 308) hosted by cloud provider 306a and operates as a cloud-based data broker. For instance, messaging service 602 may distribute data sourced by IoT nodes 132a-132c to any number of applications for consumption. In some embodiments, messaging service 602 may employ a publish/subscribe mechanism whereby devices, such as edge device 122, publish messages to messaging service 602 and those messages are then provided to those data consumers subscribed to this distribution. These subscriptions may also be logically divided, such as by associating the published messages with message topics, allowing a data consumer (e.g., an application) to only receive the data of relevance to it. Examples of messaging services include Azure IoT Hub, AWS IoT Core, and those operated by device manufacturers.

In various embodiments, controller 604 and edge device 122 may perform an enrollment exchange 608. To do so, an administrator may interact with controller 604 to onboard edge device 122, such as to provide supervisory control over edge device 122. For instance, after enrollment, controller 604 may push policies, configurations, scripts for execution, or the like to edge device 122. In various embodiments, the enrollment process may enroll edge device 122 with controller 604 to be eligible to publish messages to messaging service 602. To this end, enrollment exchange 608 and/or the input of the administrator may allow controller 604 to collect information regarding edge device 122 such as its domain identification, MAC address, universally unique identifier (UUID), which topics to which edge device 122 may publish, or the like. In doing so, controller 604 is now considered a trusted identity repository for edge device 122, along with its allowed messaging policy.

Figure 6A:
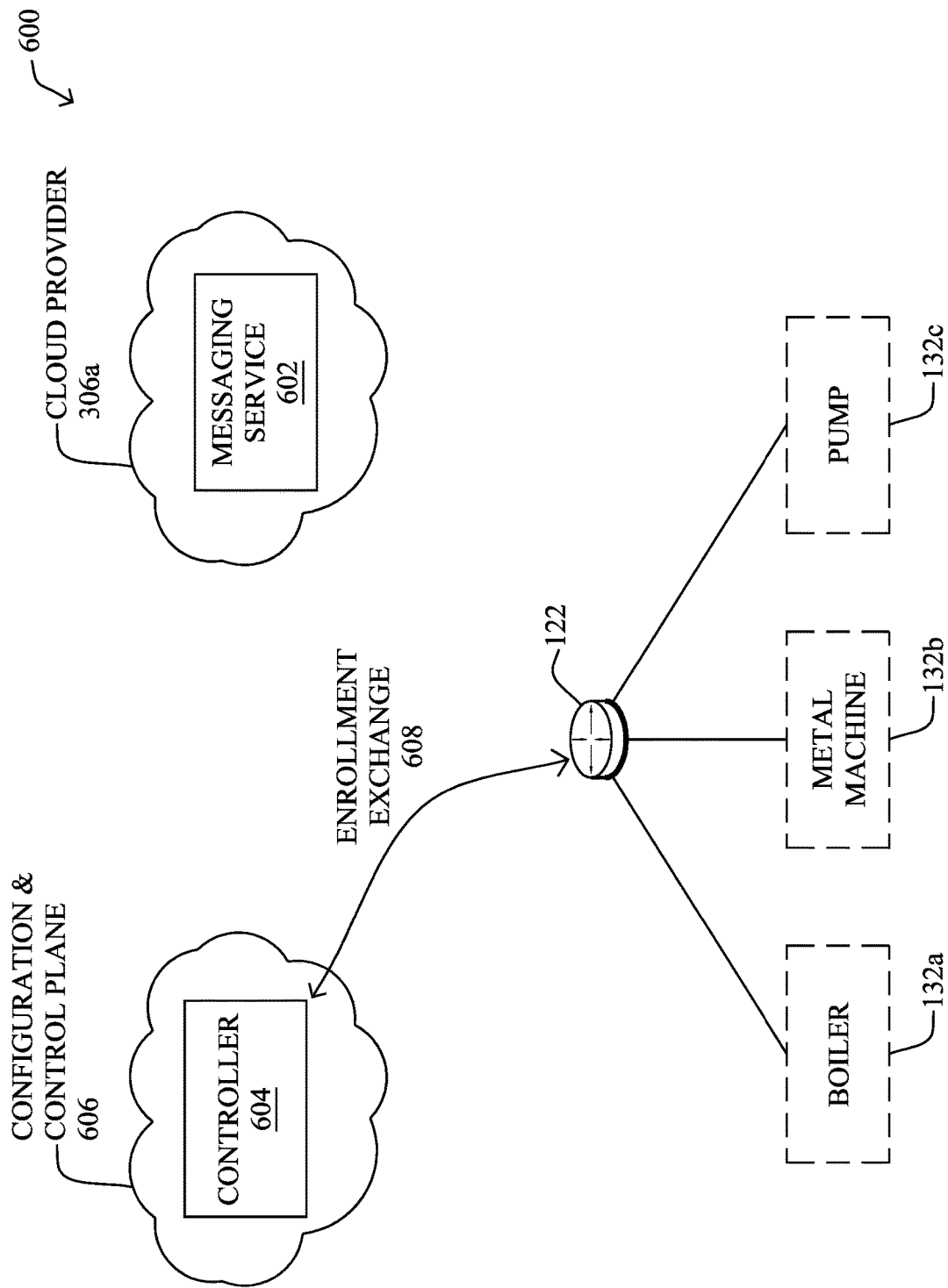
FIGS. 6A-6F illustrates an example of the zero trust onboarding of an edge device.
Figure 6B:
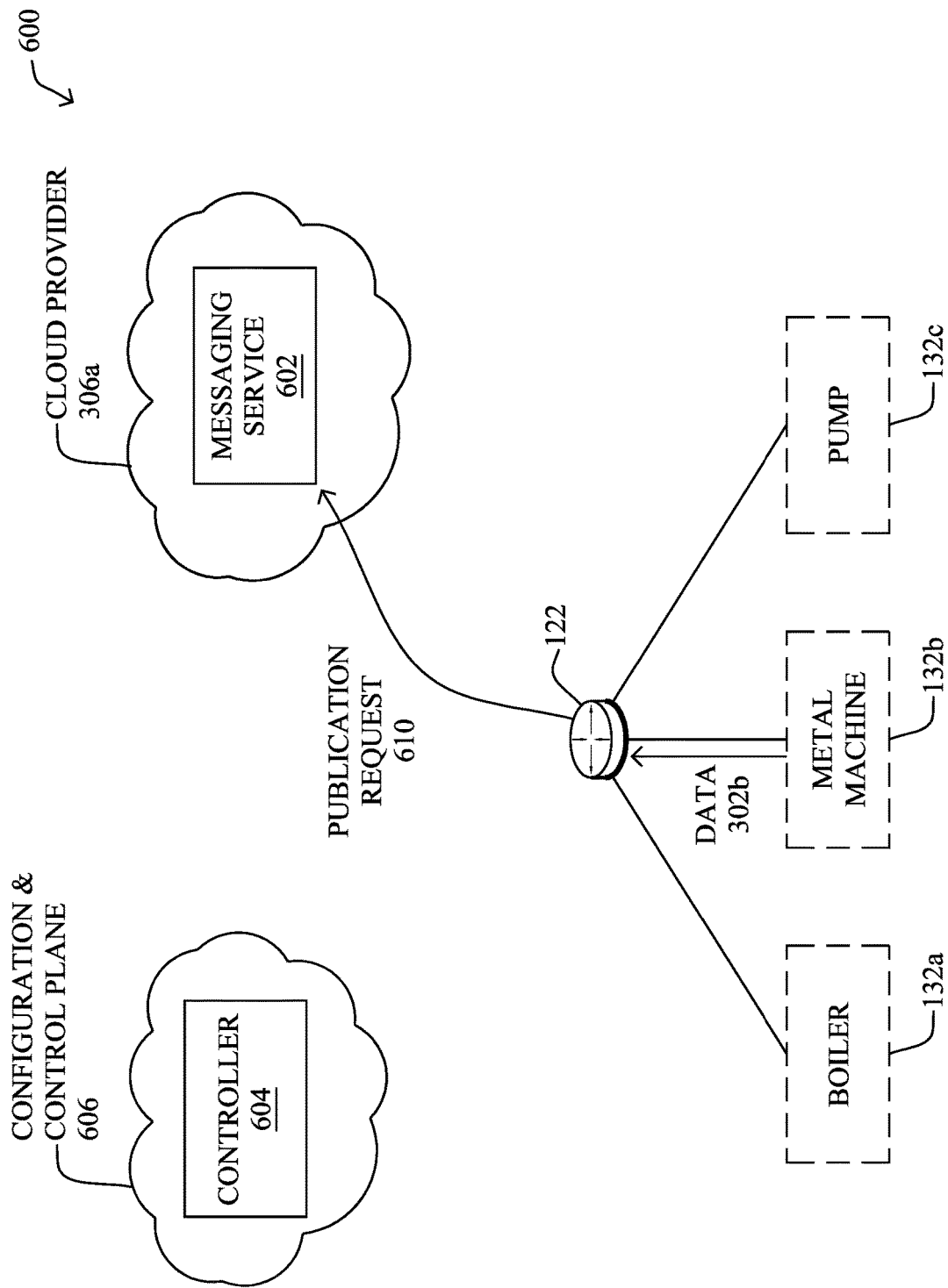

As shown in FIG. 6B, once edge device 122 has been enrolled with controller 604, assume now that edge device 122 is to publish messages to messaging service 602 that comprise data 302b sourced from IoT node 132, such as a temperature reading, rotational speed measurement, or the like. To do so, edge device 122 may send a publication request 610 to messaging service 602 regarding data 302b. For instance, publication request 610 may be sent via MQTT or other protocol used by messaging service 602 and may indicate the particular topic associated with data 132b. In one embodiment, messaging service may first authenticate edge device 122 using a traditional mechanism, such as public key infrastructure with X.509 certificates.

Figure 6C:
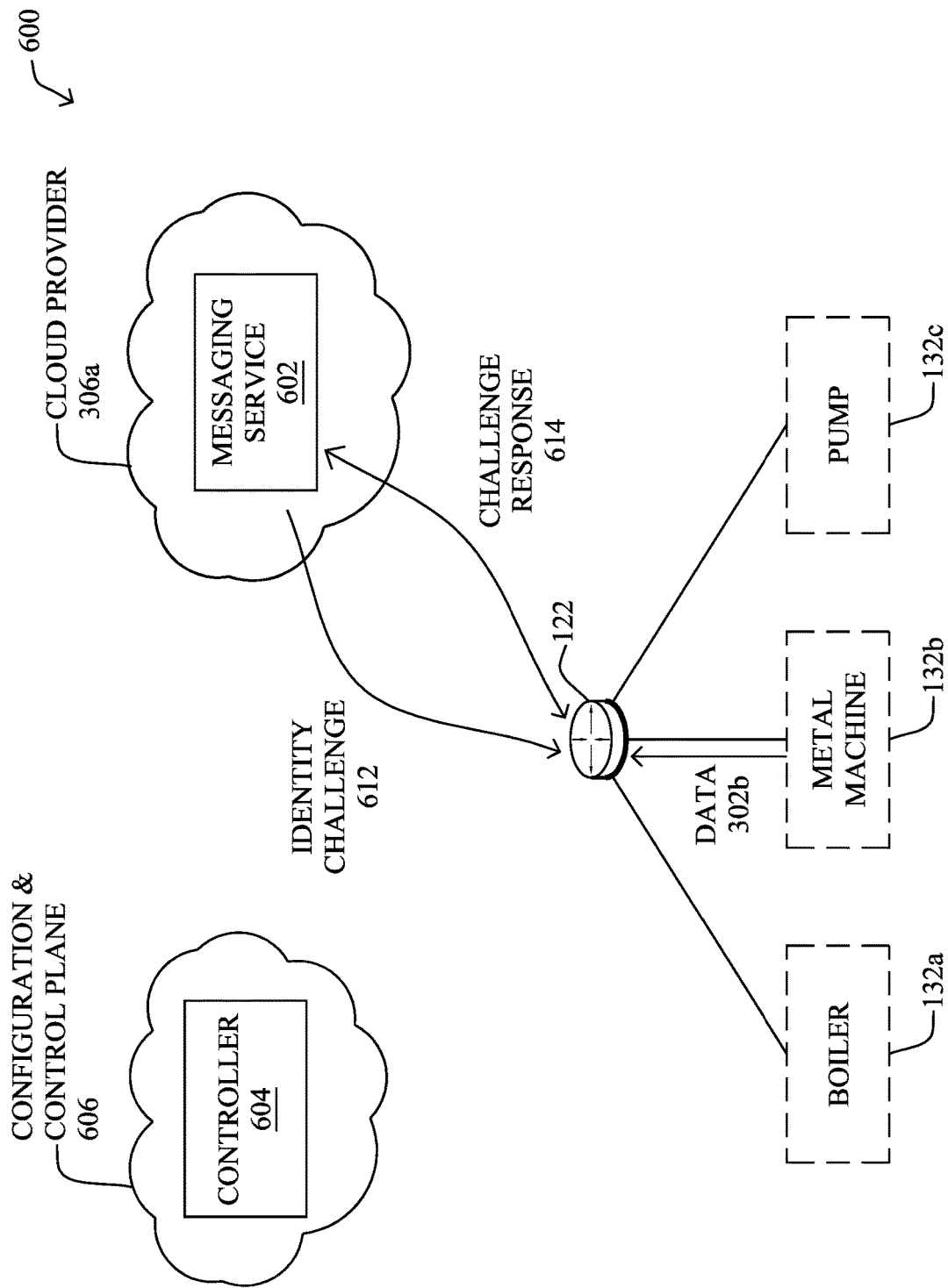

As shown in FIG. 6C, in response to receiving publication request 610, messaging service 602 may issue an identity challenge 612 to edge device 122 to provide identification information as part of challenge response 614. Indeed, messaging service 602 may not allow edge device 122 to publish messages until its identity has been fully confirmed. In various embodiments, the identity challenge and response may be performed as a separate exchange or the requisite identification information may be included in publication request 610 by edge device 122.

In various embodiments, the identification information requested via identity challenge 612 and included in challenge response 614 may include the identity of controller 604, such as its UUID, MAC address, or the like, the identity of the trusted domain to which it belongs, any policies to which edge device 122 is enrolled, or other information that can be used to ensure that edge device 122 is indeed authorized to publish messages to messaging service 602. The exchange of identity challenge 612 and challenge response 614 may be achieve via MQTT, Remote Authentication Dial-In User Service (RADIUS), or other suitable protocol.

Figure 6D:
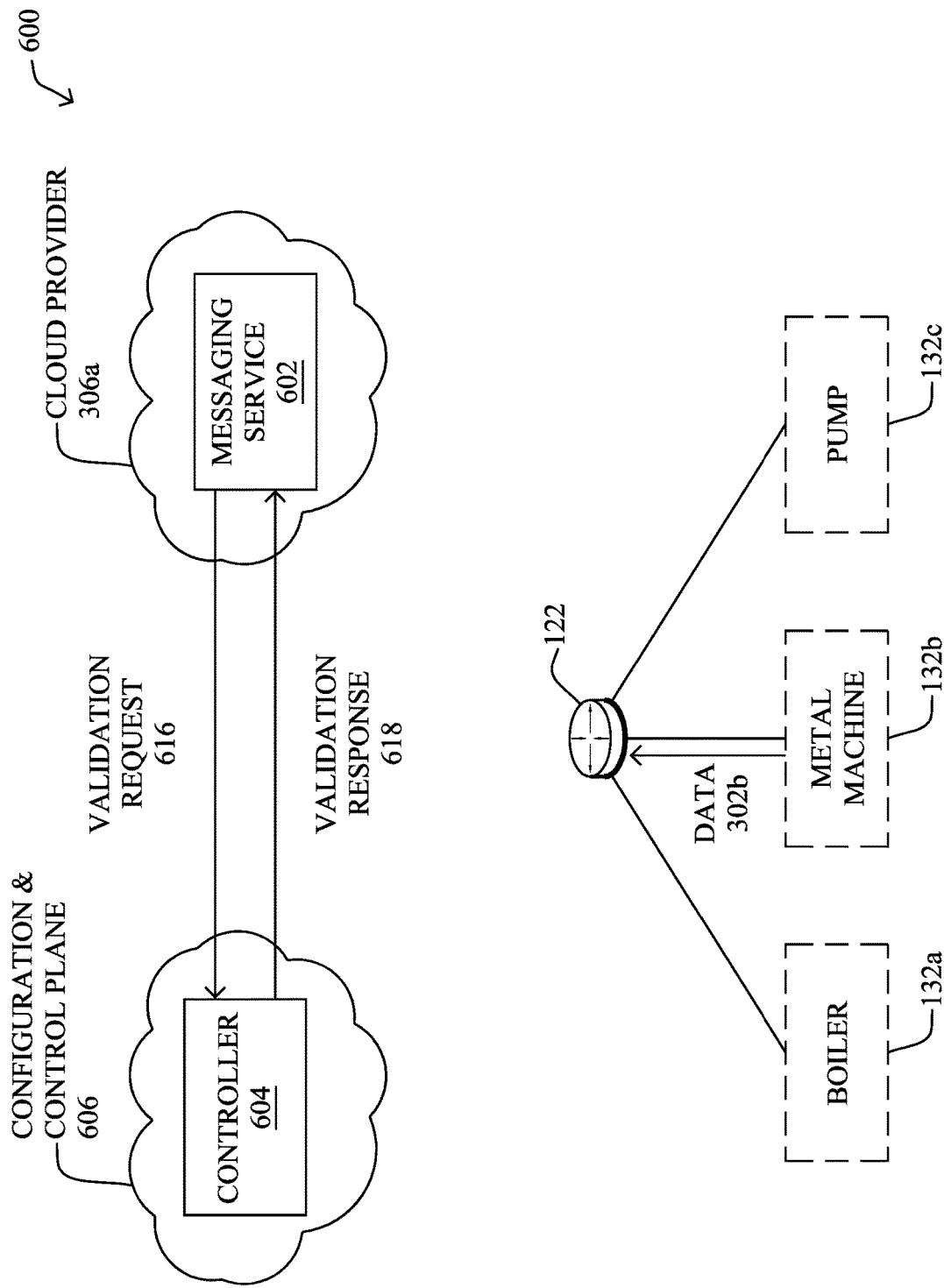

As shown in FIG. 6D, before messaging service 602 authorizes edge device 122 to publish messages, messaging service 602 may initiate another exchange with controller 604. During this exchange, messaging service 602 may send a validation request 616 to controller 604, requesting confirmation that a trust relationship already exists between controller 604 and edge device 122. Note that a similar trust relationship may already exist between controller 604 and messaging service 602.

More specifically, in various embodiments, validation request 616 may essentially query controller 604 for any or all of the following:
  Does the messaging domain name provided by edge device 122 in challenge response 614 exist?
  Is the topic being requested by publication request 610 valid for this domain?
  Is the UUID (or other identifier) of edge device 122 known?

Is edge device 122 authorized to publish/subscribe to this topic?

Are there any access (time of day, etc.) restrictions on the publication?

Did edge device 122 exceed operational metrics like connection attempts, number of messages over time, volume of messages over time, etc.?

Is the UUID known by another device in the network (e.g., another edge device), to validate against identity theft.

In response to receiving validation request 616, controller 604 compares the information in validation request 616 with its own stored information regarding edge device 122. In turn, controller 604 may send a validation response 618 indicative of whether a trust relationship exists between controller 604 and edge device 122, whether edge device 122 is authorized to publish its requested messages, and/or the conditions under which edge device 122 is authorized to publish (e.g., time periods during which it may publish messages, etc.).

Figure 6E:
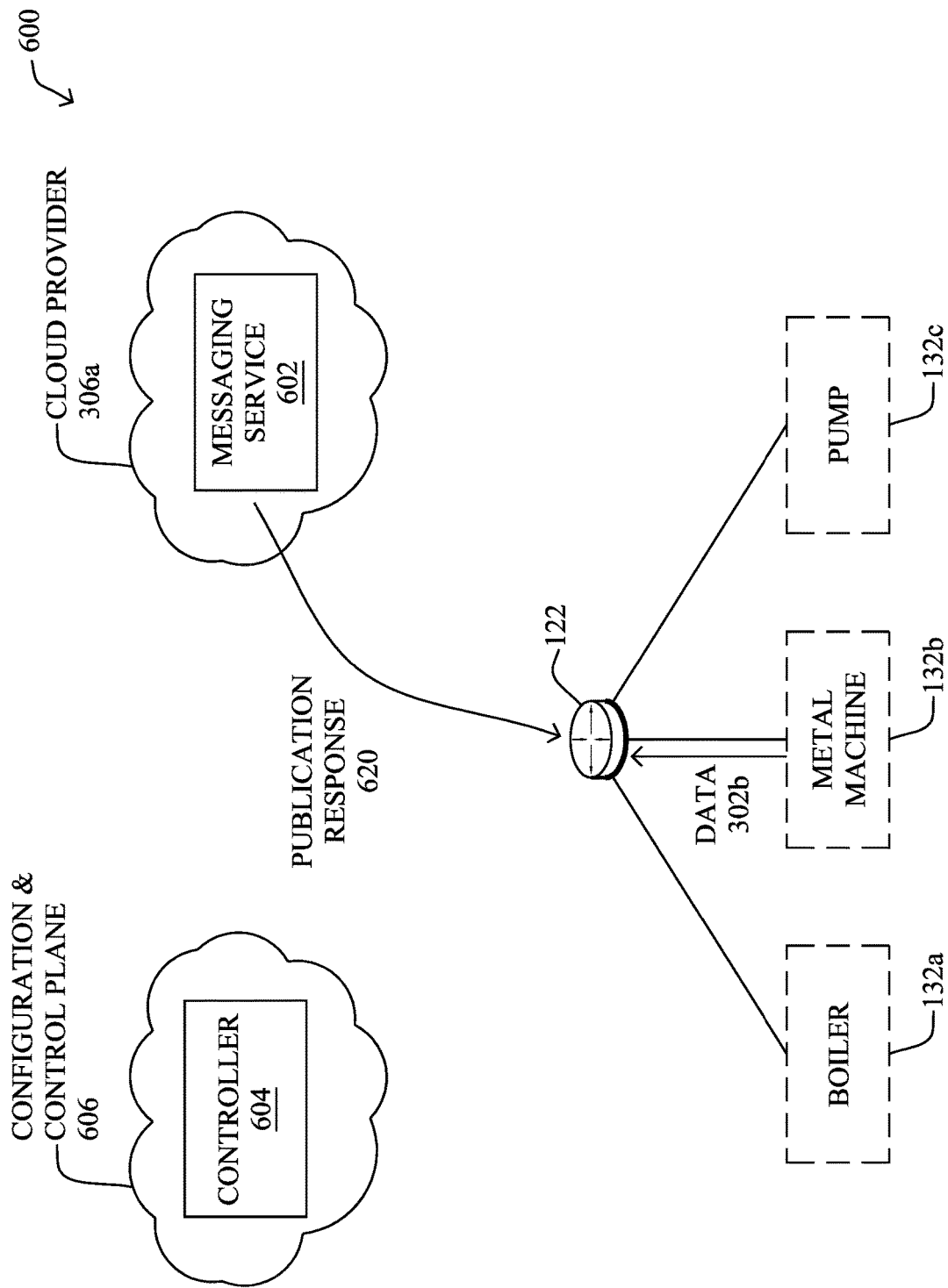

As shown in FIG. 6E, messaging service 602 may then send a publication response 620 to edge device 122 that indicates whether publication request 610 has been approved or denied. More specifically, if a trust relationship does not exist between controller 604 and edge device 122, controller 604 may indicate so in validation response 618 and messaging service 602 will then decline publication request 610 via publication response 620. Conversely, if a trust relationship exists between controller 604 and edge device 122, and controller 604 confirms that edge device 122 may publish the requested messages to messaging service 602, messaging service 602 may send publication response 620 to edge device 122 indicating that it may now publish those messages (e.g., to the requested topic).

Figure 6F:
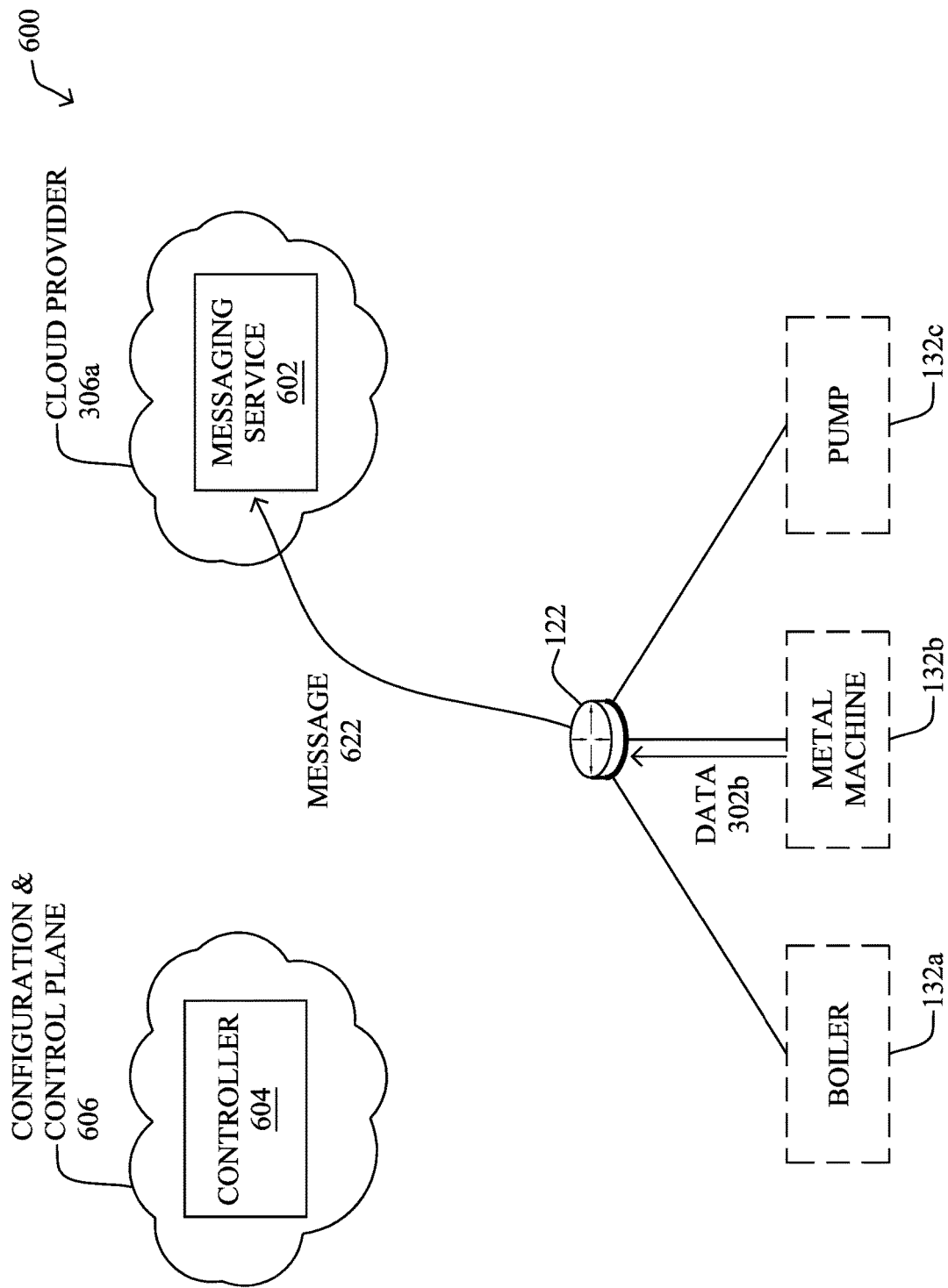

As shown in FIG. 6F, assume that edge device 122 has been authorized to publish messages to messaging service 602 that comprise data sourced from IoT node 132b. In such a case, edge device 122 may process data 302b from IoT node 132b using any or all of the techniques above and send a corresponding message 622 to messaging service 602 for publication. For instance, edge device 122 may extract data 302b from traffic that uses a first protocol, normalize data 302b, potentially transform data 302b, and send the resulting data (e.g., data 304 described previously) in message 622 using the relevant protocol for messaging service 602. For instance, edge device 122 may extract data 302b from a Modbus message, normalize and/or transform data 302b, and send the resulting data in message 622 via MQTT to messaging service 602. In another embodiment, edge device 122 may send the raw data 302b via message 622 to messaging service 602. Once messaging service 602 has received message 622, it may post the data from message 622 for consumption by the subscribed data consumers, such as other cloud-hosted applications.

Figure 7:
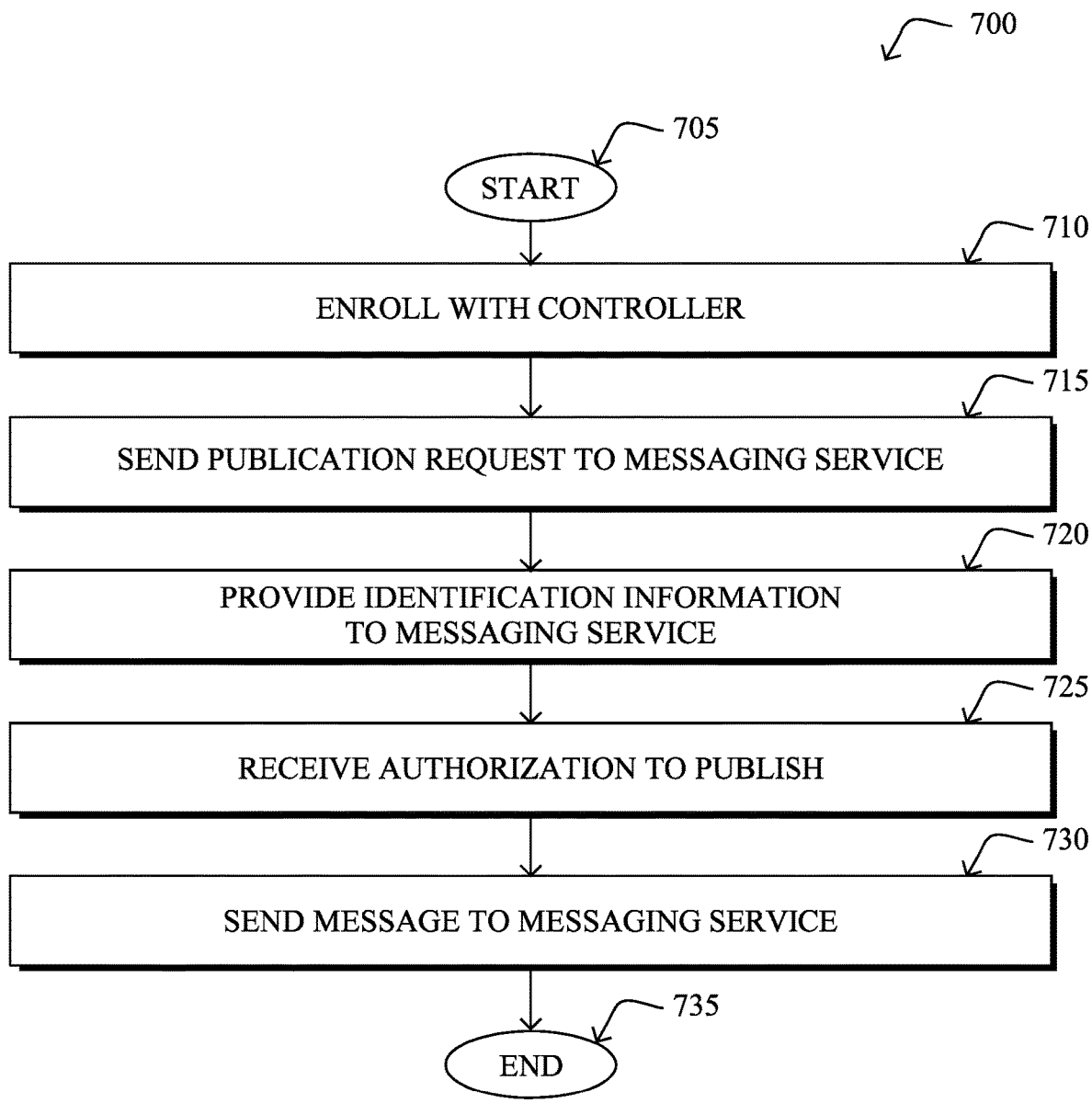
FIG. 7 illustrates an example simplified procedure for the zero trust onboarding of an edge device.

FIG. 7 illustrates an example simplified procedure for the zero trust onboarding of an edge device, in accordance with one or more embodiments described herein. The procedure 700 may start at step 705, and continues to step 710, where, as described in greater detail above, a networking device at an edge of a network (e.g., device 200), such as a router, gateway, access point, or other piece of networking equipment, may enroll with a controller that supervises operation of the networking device. Such a controller may be located in the network itself or, alternatively, remotely from that of the networking device. During the enrollment process, an administrator may interface with the controller, to register the networking device for supervisory control over the networking device. Such control may include, for instance, pushing policies and/or configurations to the networking device, monitoring the performance of the networking device, sending or updating scripts for execution by the networking device, or the like.

At step 715, as detailed above, the networking device may send a publication request to a cloud-based messaging service. In general, the cloud-based messaging service may utilize a publish-subscribe mechanism whereby messages are published to the service and disseminated to those data consumers that subscribe to the service, such as various cloud-hosted applications that consume the published data. For instance, a temperature measurement may be published to the messaging service. To help organize the published data, messages may be published to corresponding topics, allowing the different data consumers to receive only the data that is relevant to them.

At step 720, the networking device may provide to the cloud-based messaging service identification information that indicates the controller that supervises operation of the networking device, as described in greater detail above. In various embodiments, the identification information further comprises a universally unique identifier (UUID) or media access control (MAC) address of the networking device. In various embodiments, the networking device may send the identification information using a protocol such as MQTT, Remote Authentication Dial-In User Service (RADIUS), or the like.

At step 725, as detailed above, the networking device may receive, from the cloud-based messaging service, authorization to publish messages to the cloud-based messaging service. In various embodiments, the cloud-based messaging service uses the identification information to confirm an identity of the networking device with the controller that supervises operation of the networking device. In one embodiment, the cloud-based messaging service also verifies with the controller that supervises operation of the networking device that the networking device is authorized to publish to the topic. In another embodiment, the authorization indicates a time period during which the networking device is restricted from publishing messages to the cloud-based messaging service.

At step 730, the networking device may send, after receiving authorization to publish messages to the cloud-based messaging service, a message for publication to the cloud-based messaging service, as described in greater detail above. In some embodiments, the message comprises data sourced from an endpoint in the network, such as a sensor. In some embodiments, the networking device may extract, using a protocol connector of the networking device, the data sourced from the endpoint from traffic in the network sent via a first protocol (e.g., OPC UA, Modbus, etc.). In turn, the networking device may send the message for publication via a second protocol (e.g., MQTT, etc.). Procedure 700 then ends at step 735.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a zero trust architecture that allows a cloud-hosted messaging service to verify the identity of an edge device before allowing that device to publish messages to the service.

While there have been shown and described illustrative embodiments for zero trust for edge devices, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed by certain locations within a network, the techniques herein could also be performed at other locations, such as at one or more locations fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
    enrolling, by a networking device at an edge of a network, with a controller that supervises operation of the networking device;
    sending, by the networking device, a publication request to a cloud-based messaging service;
    providing, by the networking device and to the cloud-based messaging service, identification information that indicates the controller that supervises operation of the networking device;
    receiving, at the networking device and from the cloud-based messaging service, authorization to publish messages to the cloud-based messaging service, wherein the cloud-based messaging service uses the identification information to confirm an identity of the networking device with the controller that supervises operation of the networking device; and
    sending, by the networking device and after receiving authorization to publish messages to the cloud-based messaging service, a message for publication to the cloud-based messaging service, wherein the message comprises data sourced from an endpoint in the network.

2. The method as in claim 1, wherein the identification information further comprises a universally unique identifier (UUID) or media access control (MAC) address of the networking device.

3. The method as in claim 1, wherein networking device comprises one of: a network router, a network gateway, or a network access point.

4. The method as in claim 1, wherein the publication request specifies a topic, and wherein the cloud-based messaging service verifies with the controller that supervises operation of the networking device that the networking device is authorized to publish to the topic.

5. The method as in claim 1, wherein sending the message for publication to the cloud-based messaging service comprises:
    extracting, by the networking device and using a protocol connector of the networking device, the data sourced from the endpoint from traffic in the network sent via a first protocol; and
    sending, by the networking device, the message for publication via a second protocol.

6. The method as in claim 5, wherein the second protocol is MQTT.

7. The method as in claim 1, wherein the identification information is provided to the cloud-based messaging service via MQTT or Remote Authentication Dial-In User Service (RADIUS).

8. The method as in claim 1, wherein the authorization indicates a time period during which the networking device is restricted from publishing messages to the cloud-based messaging service.

9. The method as in claim 1, wherein the endpoint in the network is a sensor.

10. An apparatus, comprising:
    one or more network interfaces to communicate with a network;
    a processor coupled to the one or more network interfaces and configured to execute one or more processes; and
    a memory configured to store a process that is executable by the processor, the process when executed configured to:
        enroll with a controller that supervises operation of the apparatus;
        send a publication request to a cloud-based messaging service;
        provide, to the cloud-based messaging service, identification information that indicates the controller that supervises operation of the apparatus;
        receive, from the cloud-based messaging service, authorization to publish messages to the cloud-based messaging service, wherein the cloud-based messaging service uses the identification information to confirm an identity of the apparatus with the controller that supervises operation of the apparatus; and
        send, after receiving authorization to publish messages to the cloud-based messaging service, a message for publication to the cloud-based messaging service, wherein the message comprises data sourced from an endpoint in the network.

11. The apparatus as in claim 10, wherein the identification information further comprises a universally unique identifier (UUID) or media access control (MAC) address of the apparatus.

12. The apparatus as in claim 11, wherein the apparatus comprises one of: a network router, a network gateway, or a network access point.

13. The apparatus as in claim 10, wherein the publication request specifies a topic, and wherein the cloud-based messaging service verifies with the controller that supervises operation of the apparatus that the apparatus is authorized to publish to the topic.

14. The apparatus as in claim 10, wherein the apparatus sends the message for publication to the cloud-based messaging service by:
    extracting, using a protocol connector of the apparatus, the data sourced from the endpoint from traffic in the network sent via a first protocol; and
    sending the message for publication via a second protocol.

15. The apparatus as in claim 14, wherein the second protocol is MQTT.

16. The apparatus as in claim 10, wherein the identification information is provided to the cloud-based messaging service via MQTT or Remote Authentication Dial-In User Service (RADIUS).

17. The apparatus as in claim 10, wherein the authorization indicates a time period during which the apparatus is restricted from publishing messages to the cloud-based messaging service.

18. The apparatus as in claim 10, wherein the endpoint in the network is a sensor.

19. The apparatus as in claim 10, wherein the cloud-based messaging service provides the message to one or more cloud-hosted applications.

20. A tangible, non-transitory, computer-readable medium storing program instructions that cause a networking device at an edge of a network to execute a process comprising:

enrolling, by the networking device at an edge of a network, with a controller that supervises operation of the networking device;

sending, by the networking device, a publication request to a cloud-based messaging service;

providing, by the networking device and to the cloud-based messaging service, identification information that indicates the controller that supervises operation of the networking device;

receiving, at the networking device and from the cloud-based messaging service, authorization to publish messages to the cloud-based messaging service, wherein the cloud-based messaging service uses the identification information to confirm an identity of the networking device with the controller that supervises operation of the networking device; and sending, by the networking device and after receiving authorization to publish messages to the cloud-based messaging service, a message for publication to the cloud-based messaging service, wherein the message comprises data sourced from an endpoint in the network.

* * * * *

UNITED STATES PATENT AND TRADEMARK OFFICE
CERTIFICATE OF CORRECTION

| | | |
|---|---|---|
| PATENT NO. | : 11,516,199 B2 | |
| APPLICATION NO. | : 16/931902 | |
| DATED | : November 29, 2022 | |
| INVENTOR(S) | : Robert E. Barton et al. | |

It is certified that error appears in the above-identified patent and that said Letters Patent is hereby corrected as shown below:

In the Specification

Column 1, Line 28, please amend as shown:
sensor. To this end, data pipelines are often constructed Signed and Sealed this
Twenty-first Day of February, 2023

Katherine Kelly Vidal
*Director of the United States Patent and Trademark Office*